United States Patent

Clare

[11] Patent Number: 5,845,674
[45] Date of Patent: Dec. 8, 1998

[54] FLOW- AND TEMPERATURE-CONTROL VALVE

[75] Inventor: Manamohan Clare, Missisauga, Canada

[73] Assignee: Friedrich Grohe AG, Hemer, Germany

[21] Appl. No.: 783,316

[22] Filed: Jan. 15, 1997

[30] Foreign Application Priority Data

Jan. 18, 1996 [CA] Canada .................................... 2167568

[51] Int. Cl.⁶ ...................................................... F16K 11/12
[52] U.S. Cl. .................. 137/454.2; 137/597; 137/637.3; 251/288
[58] Field of Search ............................. 137/637.3, 637.5, 137/597, 607, 454.2, 454.6; 251/288

[56] References Cited

U.S. PATENT DOCUMENTS

| | | | |
|---|---|---|---|
| 1,504,496 | 8/1924 | Detcher | 137/637.3 |
| 4,685,156 | 8/1987 | Brabazon | 137/597 X |
| 4,981,156 | 1/1991 | Nicklas et al. | 137/637.3 X |
| 5,048,792 | 9/1991 | Fischer | 137/597 X |

*Primary Examiner*—Stephen M. Hepperle
*Attorney, Agent, or Firm*—Herbert Dubno; Andrew Wilford

[57] ABSTRACT

A temperature- and flow-control valve has a housing defining a mixing chamber and having at least one outlet extending from the mixing chamber and a pair of inlets. A valve cartridge in the housing connected to the inlets opens into the mixing chamber and has a temperature-control element displaceable between an end off position with the cartridge blocking any flow from the inlets through the cartridge to the chamber through intermediate on positions with different ratios of flow from the inlets to the mixing chamber. A flow-control unit in the housing between the cartridge and the outlet includes a flow-control element displaceable between a position for maximum flow from the cartridge to the outlet and a position for restricted flow from the cartridge to the outlet. A link assembly in the housing couples the temperature-control element to the flow-control element for returning the flow-control element to the maximum-flow position on displacement of the temperature control element into the off position.

10 Claims, 3 Drawing Sheets

5,845,674

FLOW- AND TEMPERATURE-CONTROL VALVE

FIELD OF THE INVENTION

The present invention relates to a valve. More particularly this invention concerns a pressure-balancing flow- and temperature-control valve such as used in a bathtub, shower, or sink.

BACKGROUND OF THE INVENTION

Pressure-balancing valves are known for bath and shower installations, most using a single handle to control the pressure and temperature of the water issuing from the valve. Typically, there will be a diverter, either integral with the valve or separate, which is used to divert water of the desired temperature to the bathtub or to the shower. Many such valves have a valve housing into which a valve cartridge can be placed, the cartridge containing components which serve to equalize the pressure of water issuing therefrom so as to compensate for pressure fluctuations in the hot and cold water inlet lines. These cartridges are especially useful in multi-unit installations such as hotels or other institutions where the tub/shower for one living unit may be adjacent a wall that is common with the tub/shower of an adjacent living unit. In such installations the living units may share the hot and cold water lines feeding water to the units and the cartridge may be positioned in differently oriented positions to compensate for the fact that the hot water line may be on the left in one unit and on the right in the other unit. Water coming from the hot and cold outlets of the cartridge is pressure compensated by the internal components of the cartridge and enters a mixing chamber from which the mixed water flows to the diverter and then to the tub or to the shower as desired.

Commonly owned Canadian Patent Applications 2,076,924, 2,109,034, and 2,114,855 describe typical pressure-balancing mixing valves which accommodate a mixing cartridge such as described above. The mixing valves of the above-identified patents do not adequately permit control of the flow of water issuing from the valve to either the tub or the shower. There is a need for a separate control mechanism to allow the user to select the flow of water at the desired temperature that flows to the tub or shower. There is also a need for such an arrangement whereby the flow-control means is connected to the temperature-control means so that the flow control is returned to a neutral or full flow condition whenever the valve is shut off.

OBJECTS OF THE INVENTION

It is therefore an object of the present invention to provide an improved flow- and temperature-control valve.

Another object is the provision of such an improved flow- and temperature-control valve which overcomes the above-given disadvantages, that is which allows the flow rate and temperature of the water issuing from the valve to be controlled independently of each other while resetting itself to a predetermined position with respect to flow and temperature when shut off.

SUMMARY OF THE INVENTION

A temperature- and flow-control valve has according to the invention a housing defining a mixing chamber and having at least one outlet extending from the mixing chamber and a pair of inlets. A valve cartridge in the housing connected to the inlets opens into the mixing chamber and has a temperature-control element displaceable between an end off position with the cartridge blocking any flow from the inlets through the cartridge to the chamber through intermediate on positions with different ratios of flow from the inlets to the mixing chamber. A flow-control unit in the housing between the cartridge and the outlet includes a flow-control element displaceable between a position for maximum flow from the cartridge to the outlet and a position for restricted flow from the cartridge to the outlet. A link assembly in the housing couples the temperature-control element to the flow-control element for returning the flow-control element to the maximum-flow position on displacement of the temperature control element into the off position.

Thus with this system as the valve is turned on the flow is initially set at the maximum rate. The desired temperature is then set along with the desired flow rate. When the valve is closed, the flow rate is again set at maximum for the next use of the valve.

According to the invention the temperature-control element includes a handle rotatable on the housing. The housing is provided with an abutment operatively engageable with the handle in the end off position. The flow-control element also includes a handle rotatable on the housing coaxially with the temperature-control element. The cartridge has hot- and cold-water outlets opening into the chamber and the flow-control element includes a plurality of apertured lobes displaceable between a position corresponding to the maximum flow position and offset from the cartridge outlets and positions corresponding to the restricted-flow position and at least partially blocking flow from the cartridge outlets. The flow-control element has three such lobes separated by spaces. The cartridge outlets are aligned with the spaces in the maximum-flow position.

The flow-control handle lies outside the temperature-control handle and the temperature-control handle is formed with an arcuate slot and the abutment is a pin fixed on the housing and engaging in the slot. In addition a second abutment is releasably fixed in the slot and engageable with the pin. This second abutment includes a compressible element with a ridged exterior lockingly engageable with the ridged sides. More particularly the second abutment is generally U-shaped and has a pair of arms having outer edges forming the ridged exterior.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
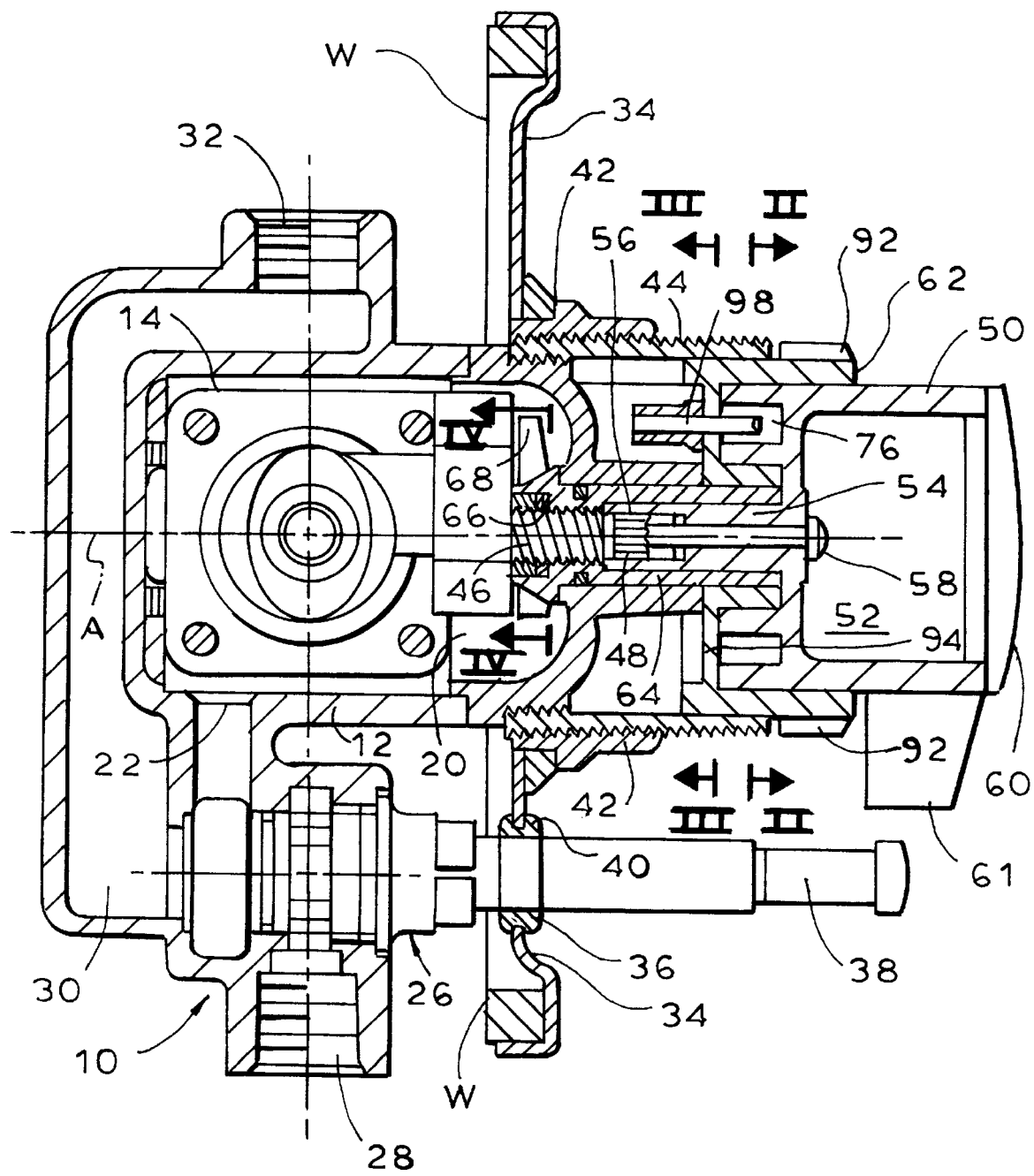
FIG. 1 is an axial section through the valve of this invention.
Figure 4:
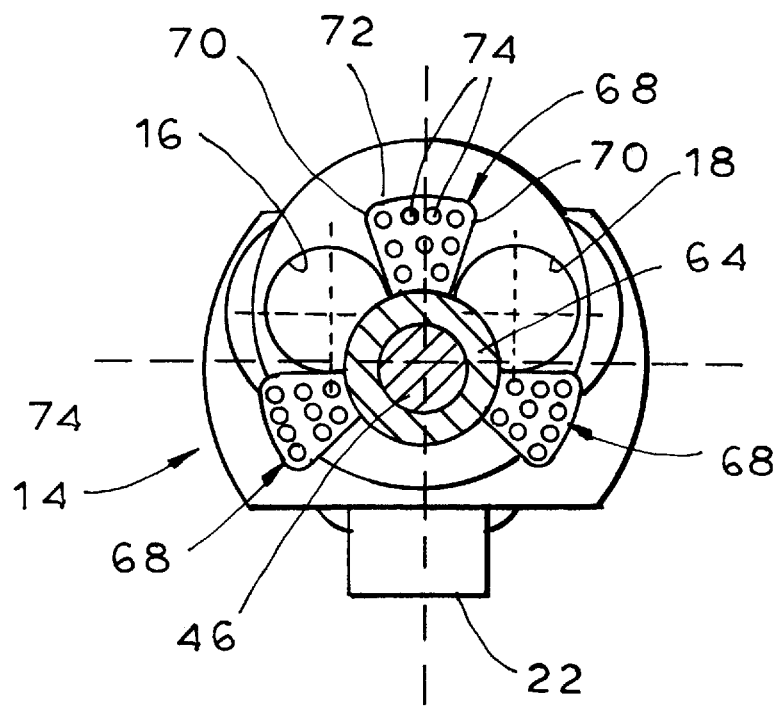
Figure 5:
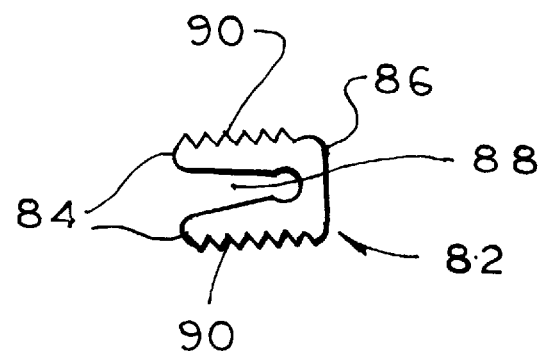
FIG. 5 is a side view of a stop usable in the valve of this invention.

As seen in FIG. 1 balancing valve 10 includes a generally cylindrical housing 12 defining an axis A and having hot and cold water inlets (not shown), the centerlines of which are perpendicular to the plane of FIG. 1. A pressure-balancing cartridge 14 is positioned within the housing 12 so as to receive hod and cold water coming from the inlets to the housing 12. The cartridge 14 can be positioned within the housing 12 in either of two orientations depending on the positioning of the inlets relative to the housing 12. As shown in FIG. 4 the cartridge 14 has a hot-water outlet 16 and a cold-water outlet 18 which open into a mixing chamber 20 within the housing 12. A mixed water outlet passage 22 leads from the chamber 20 to a diverter 26 which, in one of its two positions, permits mixed water to flow to a first conduit 28 leading to a tub (not shown), and in the other position permits water to flow through a bypass channel 30 to a second conduit 32 leading to a shower (not shown).

The housing 12 is located behind a wall whose outer plane is shown at W, with an opening in the wall being covered by an escutcheon plate 34. The escutcheon plate 34 has a hole 36 through which axially extends a shaft 38 of the diverter 26, the opening 36 being sealed around the shaft 38 by a grommet or O-ring 40. The escutcheon plate 34 is shown at an extreme inner position relative to the housing 12 as defined by the wall structure but can be set much further out if site conditions demand. A threaded collar 42 to which the escutcheon plate 34 is attached is threaded on an externally threaded sleeve 44 which in turn is threaded on the housing 12. The threadedly adjustable collar and escutcheon plate can accommodate situations in which the housing 12 is not located at a standard or fixed position relative to the wall plane W.

Within the cartridge 14 there is a disk (not shown) which controls the relative quantity of hot and cold water exiting the cartridge 14 so as to control the temperature of the resulting water flow. The disk within the cartridge 14 can permit more hot water to exit the outlet 16, for example, than cold water exiting the other outlet 18, resulting in a warm or even hot water mix within the chamber 20. The cartridge disk is attached to an axially extending cylindrical stem 46 having a splined end 48. A temperature-control handle 50 having a hollow interior 52 and an tubular stem 54 is connected to the splined end 48 of the stem 46. The connection is achieved by an internally splined counterbore 56 within the stem 54 and a bolt or machine screw 58 which passes along the tubular stem 54 and is threaded in a threaded counterbore in the splined end 48. The hollow interior 52 of the handle 50 is covered by a removable decorator plate 60. A radially extending flange 61 projects from the handle 50 and cooperates with indicia on the escutcheon plate to enable the desired temperature of water issuing from the housing 12 to be set.

The handle 50 can rotate between two limit positions representing the hottest and coldest water temperatures available, the coldest position also being an off position for the valve. Movement of the handle 50 away from the off position will start water flowing with the degree of rotation determining the temperature of the flowing water.

In order to control the flow or flow rate of water issuing from the valve the present invention has a second control means which has an tubular flow-control handle 62 which is coaxially nested with the temperature-control handle 50 as seen in FIG. 1. The handle 62 is attached to a tubular shaft 64 which surrounds the handle stem 54 and the cartridge stem 46. O-ring seals 66 are provided to seal the tubular shaft 64 with respect to the housing 12 and the stem 46. At its inner end within the mixing chamber 20 the tubular shaft 64 carries three angularly equispaced apertured lobes 68. As seen in FIG. 4, each lobe 68 has a pair of radially extending side edges 70, a circumferentially extending and arcuate outer edge 72, and a plurality of apertures 74 extending therethrough. As seen in FIG. 1, the lobes 68 are located closely adjacent the front face of the cartridge 14 so that there is little space between the cartridge 14 and the lobes.

The two coaxial control handles 50 and 62 are interconnected together for joint operation. In particular, the flow-control handle 62 is connected to the temperature-control handle 50 in such a manner that movement of the temperature-control handle 50 to the off position will move the flow-control handle 62 to a neutral position as seen in FIG. 4, representing maximum water flow from the cartridge 14 into the mixing chamber 20. The interconnection between the two handles is seen in FIGS. 1, 2 and 3.

Figure 2:
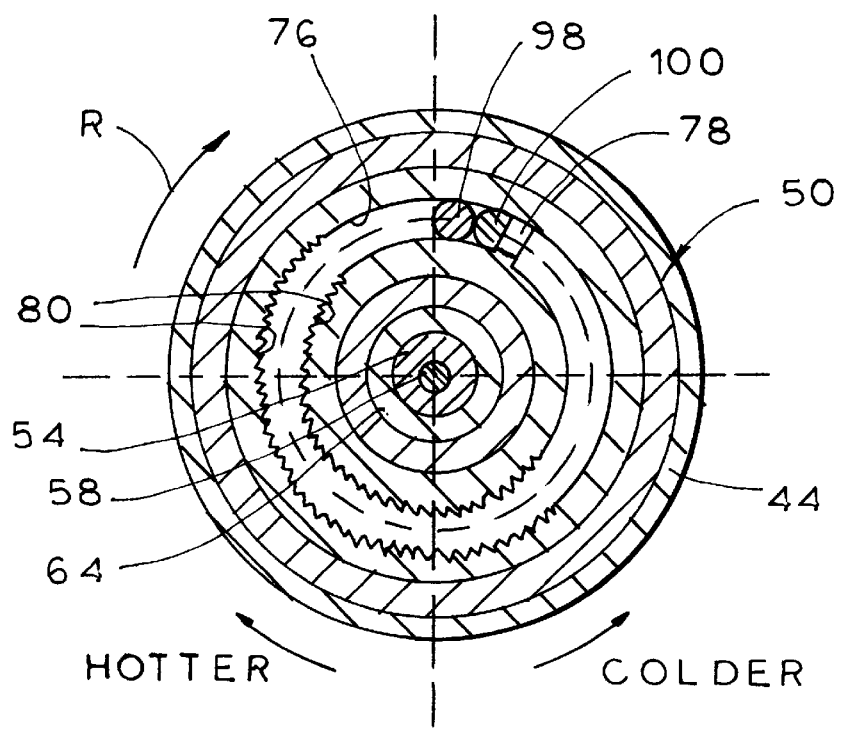
FIGS. 2, 3, and 4 are cross sections taken along respective lines II—II, III—III, and IV—IV of FIG. 1.
Figure 3:
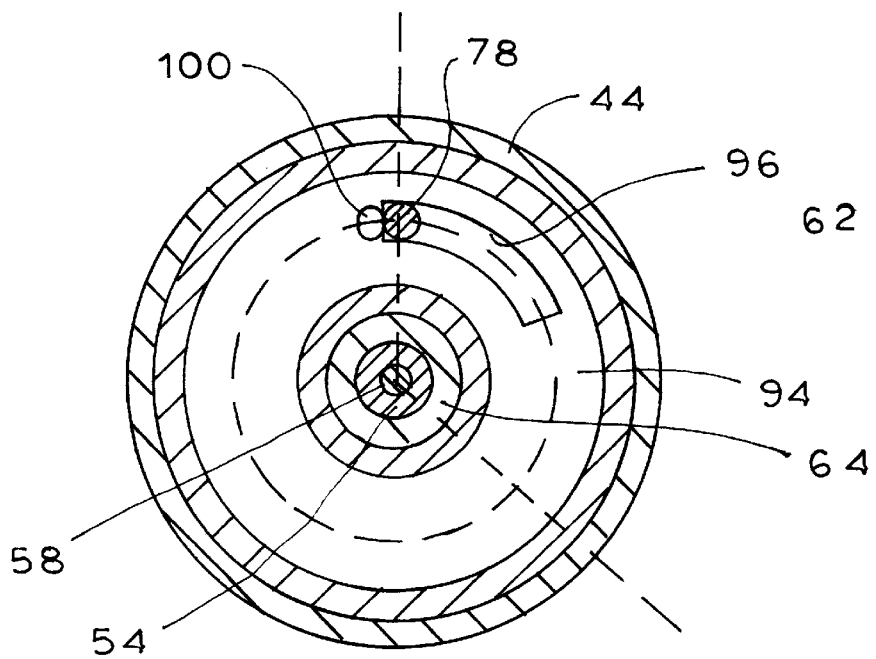

As seen in FIG. 2, the inner end of the temperature-control handle 50 is provided with an arcuate slot 76 which is interrupted by a web 78 which in turn defines one of the rotation limits mentioned above. A portion of the arcuate slot 76 is defined by axially extending serrated ridged walls 80 into which an adjustable limit stop member 82 can be inserted. The stop 82 is molded from plastic, has arcuate arms 84 extending from a head 86, and a gap 88 between the arms 84. The outer edges of the arms 84 are ridged at 90. The arms 84 can be squeezed together to permit the limit stop 82 to be inserted into the ridged portion of the slot 76 or to be removed therefrom. When the arms 84 of the stop 82 are released with the stop 82 in the slot 76 the ridged edges 90 thereof engage with the ridged edge walls 80 of the slot 76 to hold the stop 82 in the desired position representing the high-temperature limit for the temperature-control handle 50. The limit stop 82 rotates with the temperature-control handle 50 and limits the rotation angle of the handle 62 by abutting a fixed pin 98 projecting from the housing 12.

As mentioned above the flow-control handle 62 is nested coaxially with the temperature-control handle 50 as seen in FIG. 1. The flow-control handle 62 is formed with an annular array of ridges 92 about its periphery to enable a user to grip the handle 62 securely for adjusting the flow rate of water from the valve 10. An inner wall 94 of the flow-control handle 62 is formed with an arcuate slot 96 (FIG. 3) which extends over less than 90°. The fixed pin 98 projects from the housing 12 and extends through the slot 96 of the flow-control handle 62 and into the adjacent slot 76 of the temperature-control handle 50. A post 100 fixed in the wall 94 at the end of slot 96 of the flow-control handle 62 extends through the slot 76 of the temperature-control handle 50 and interconnects the two handles 50 and 62 at the web 78.

The operation of the valve 10 incorporating the arrangement of this invention will now be described, starting with the assumption that the temperature-control handle 50 is at the off position and no water is flowing from the cartridge 14. In that position the temperature-control handle 50 is at one of its limit positions with the slot termination web 78 in contact with the post 100 of the flow-control handle 62 and with the fixed pin 98 projecting from the housing 12 in the position of FIG. 2. The flow-control handle 62 is at its neutral position with the flow-control lobes 68 positioned as in FIG. 4, one of the lobes 68 being between the cartridge outlets 16 and 18 and the other two lobes 68 fully exposing the outlets 16 and 18. In the neutral position the post 100 is in contact with the fixed pin 98 as seen in FIG. 3.

Rotation of the temperature-control handle 50 away from the off position in the direction of arrow R of FIG. 2 will start water flowing from the cartridge 14 via the outlets 16 and 18 with appropriate quantities of hot and cold water mixing in the chamber 20 to achieve water of the desired temperature, i.e. water at the temperature set by the temperature-control handle 50 when its rotation is stopped. The maximum temperature is determined by the position of the adjustable stop 82. Rotation of the temperature-control handle 50 in the direction of the arrow R will have no effect on the post 100 as it remains stationary while the wall 78 moves away from it.

To reduce the flow rate of water from the mixing chamber 20 to the diverter 26 and thence to the tub or shower, one need only rotate the flow-control handle 62 away from its neutral position as seen in FIG. 4. Such rotation of the flow-control handle 62 will move the central lobe 68 and one of the other lobes 68 from the non-obstructing position of FIG. 4 progressively in front of the adjacent outlets 16 and 18 so as to partially interrupt the water flowing therefrom and thereby reduce the flow of water issuing from the cartridge 14 to the mixing chamber. The apertures 74 in the lobes 68 ensure that the flow will never be completely interrupted and they also help to reduce the noise level of the issuing water by separating it into multiple streams.

When the user is finished and turns the temperature-control handle 50 back toward the off position, the web 78 of the temperature-control handle 50 will engage the post 100 on the flow-control handle 62, causing the flow-control handle 62 to rotate jointly with the temperature-control handle 50. When the temperature-control handle 50 reaches the off position the flow-control handle 62 will have been rotated sufficiently to move it into its neutral position with the lobes 68 oriented as seen in FIG. 4.

It is therefore clear that the present invention provides an arrangement that permits control of the flow of properly mixed water at the desired temperature issuing from a pressure-balancing control valve. The maximum flow rate is that which would otherwise be achieved without the flow-control valve in place. The minimum flow rate is in the vicinity of 2 USGPM. At no time is the flow stopped by the flow control of the present invention.

The present invention has been described in relation to a particular configuration of a pressure-balancing valve but as indicated above the invention can be adapted to other valve configurations by any skilled workman. Such workmen should be able to modify the structure of the valve installation without excessive experimentation and without departing from the spirit of the invention.

I claim:

1. A temperature- and flow-control valve comprising:
   a housing defining a mixing chamber and having at least one outlet extending from the mixing chamber and a pair of inlets;
   a valve cartridge in the housing connected to the inlets, opening into the mixing chamber, and having a temperature-control element displaceable between an end off position with the cartridge blocking any flow from the inlets through the cartridge to the chamber through intermediate on positions with different ratios of flow from the inlets to the mixing chamber;
   flow-control means in the housing between the cartridge and the outlet including a flow-control element displaceable between a position for maximum flow from the cartridge to the outlet and a position for restricted flow from the cartridge to the outlet; and
   link means in the housing coupling the temperature-control element to the flow-control element for returning the flow-control element to the maximum-flow position on displacement of the temperature control element into the off position.

2. The valve defined in claim 1 wherein the temperature-control element includes a handle rotatable on the housing, the housing being provided with an abutment operatively engageable with the handle in the end off position.

3. The valve defined in claim 2 wherein the flow-control element includes a handle rotatable on the housing coaxially with the temperature-control element.

4. The valve defined in claim 3 wherein the cartridge has hot- and cold-water outlets opening into the chamber and the flow-control element includes a plurality of apertured lobes displaceable between a position corresponding to the maximum flow position and offset from the cartridge outlets and positions corresponding to the restricted-flow position and at least partially blocking flow from the cartridge outlets.

5. The valve defined in claim 3 wherein the flow-control element has three such lobes separated by spaces, the cartridge outlets being aligned with the spaces in the maximum-flow position.

6. The valve defined in claim 3 wherein the flow-control handle lies outside the temperature-control handle.

7. The valve defined in claim 2 wherein the temperature-control handle is formed with an arcuate slot and the abutment is a pin fixed on the housing and engaging in the slot.

8. The valve defined in claim 7, further comprising
   a second abutment releasably fixed in the slot and engageable with the pin.

9. The valve defined in claim 8 wherein the slot has ridged sides and the second abutment includes a compressible element with a ridged exterior lockingly engageable with the ridged sides.

10. The valve defined in claim 9 wherein the second abutment is generally U-shaped and has a pair of arms having outer edges forming the ridged exterior.

* * * * *